SEMICONDUCTOR RECTIFIER ASSEMBLY

Filed April 3, 1963 3 Sheets-Sheet 1

WITNESSES

*Theodore F. Wrobel*

*Donald R. Lackey*

INVENTORS
Frederick G. Fellendorf
and August P. Colaiaco
BY
*F. E. Browder*
ATTORNEY Sept. 27, 1966 F. G. FELLENDORF ETAL 3,275,921

SEMICONDUCTOR RECTIFIER ASSEMBLY

Filed April 3, 1963 3 Sheets-Sheet 2

SEMICONDUCTOR RECTIFIER ASSEMBLY

Filed April 3, 1963 3 Sheets-Sheet 3

United States Patent Office 3,275,921

Patented Sept. 27, 1966

3,275,921

SEMICONDUCTOR RECTIFIER ASSEMBLY

Frederick G. Fellendorf, Monroeville, and August P. Colaiaco, Pittsburgh, Pa., assignors to Westinghouse Electric Corporation, Pittsburgh, Pa., a corporation of Pennsylvania Filed Apr. 3, 1963, Ser. No. 270,332
9 Claims. (Cl. 321—8)

This invention relates in general to alternating current rectifier apparatus and more particularly to rectifier assemblies using semiconductor rectifier devices.

For many years mercury-arc type rectifier tubes, such as ignitrons have been used to provide direct current power from a source of alternating potential. Ignitron rectifiers are a type of mercury-arc rectifier in which the base mounting connection usually constitutes the cathode electrical connection, and the anode electrical connection is generally made at the top of the ignitron casing. Ignitrons are usually liquid cooled, with suitable inlet and outlet coolant connections located on the side of the ignitron casing. While a significant advance in the art of rectification, ignitron rectifier tubes possess some disadvantages, among which are the complex excitation circuits required and their relatively high voltage drop. Pumped type ignitrons have the further disadvantage of requiring a vacuum pumping system to continuously pump a vacuum during the operation of the ignitron.

While ignitrons are still used on certain new applications, semiconductor rectifiers, such as silicon diodes, have almost universally replaced ignitrons in new rectifier installations. The semiconductor diode has substantially superseded the ignitron in all new electro-chemical installations because of the small size of the silicon diodes, their high efficiency, their high reliability and low maintenance. Since many thousands of kilowatts of ignitron rectifier equipment were installed during the twenty years preceding the introduction of the semiconductor rectifier, and since most of these rectifiers are still in operation, it has been found desirable from an economic viewpoint to replace many of the ignitron tubes in these existing installations with semiconductor diodes. Along with the very small size of the semiconductor diodes and their high reliability, other advantages of semiconductor diodes over ignitron rectifiers are the elimination of vacuum pumping equipment, the elimination of excitation circuits, since semiconductor diodes are free conducting devices, and the great savings in power when using semiconductors because of the high efficiency of the semiconductor diode compared to the ignitron rectifier. To illustrate the difference in efficiency between the semiconductor diode and ignitron, the heat exchanger for an ignitron rectifier is designed to dissipate heat produced by an arc drop of approximately 17 volts, while the heat loss in a comparably rated semiconductor diode installation is less than 20% of the heat loss in the ignitron.

If the changeover from ignitron tubes to semiconductor diodes on existing installations could be accomplished without major modification and change in electrical connections and cooling medium piping, the desirability of changing ignitron installations to semiconductor diode devices would be greatly increased.

Accordingly, it is an object of this invention to provide a new and improved rectifier assembly.

Another object of this invention is to provide a new and improved rectifier assembly using semiconductor rectifier devices.

Another object of this invention is to provide a new and improved rectifier assembly using semiconductor diodes that may be used to replace rectifier tubes in existing rectifier apparatus.

A further object of this invention is to provide a new and improved rectifier assembly using semi-conductor devices that may be used to replace mercury-arc type rectifier tubes in existing rectifier apparatus without any substantial electrical or plumbing modifications or changes being required in the existing apparatus.

Briefly, the present invention accomplishes the above cited objects by providing a new and improved rectifier assembly utilizing semiconductor rectifier devices or elements that has an overall physical size compatible with a similarly rated ignitron tube and has electrical and plumbing connections which allow the semiconductor diode assembly to be located and mounted in the same place as the ignitron tube. To change an ignitron type tube in an existing installation to semiconductor diode type rectifier apparatus requires only that the ignitron tube be disconnected and the semiconductor diode assembly be mounted in its place and connected to the existing electrical and plumbing connectors. The existing transformers, switchgear and heat exchanger equipment in the rectifier apparatus will be utilized without change or modification. The only electrical circuit change required is the disconnecting of the excitation circuit, which is not required since semiconductor diodes are free conducting.

Further objects and advantages of the invention will become apparent as the following description proceeds and features of novelty which characterize the invention will be pointed out in particularity in the claims annexed to and forming a part of this specification.

For a better understanding of the invention, reference may be had to the accompanying drawings, in which:

FIGURE 1 diagrammatically represents one embodiment of the invention;

Figure 1:
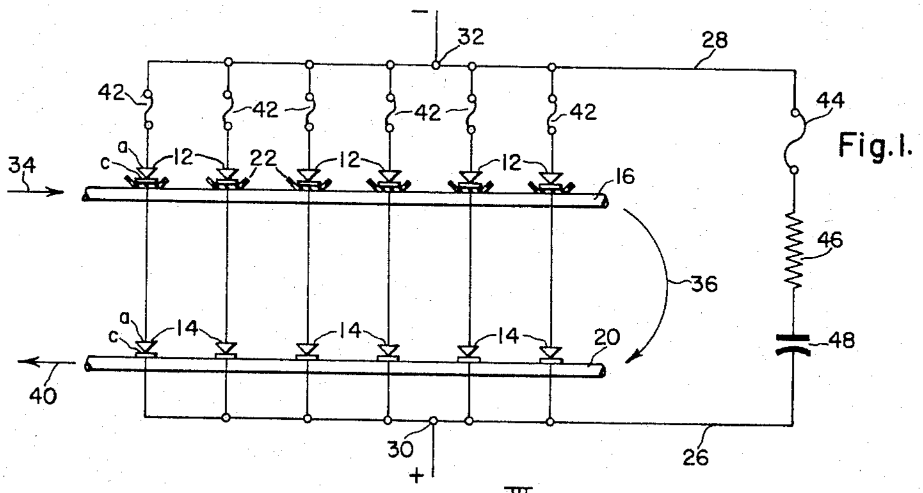

Referring now to the drawings, and FIG. 1 in particular, there is illustrated schematically a circuit arrangement of semiconductor diodes suitable for electrically replacing an ignitron type mercury-arc rectifier tube. The exact number of semiconductor diodes required to electrically replace a particular size of ignitron tube depends upon the voltage and current rating of the rectifier apparatus and upon the voltage and current rating of the semiconductor diode selected to be used in the semiconductor diode assembly.

FIGURE 1 shows an arrangement of semiconductor diodes that may be used, with two semiconductor diodes, 12 and 14, serially connected in each of six parallel legs. In this instance, the semiconductor diodes 12 and 14 are shown as forward poled cells, each having a cathode electrode *c* and an anode electrode *a*. As used throughout this specification, forward poled cells are those cells that have their cathodes electrically connected to the mounting stud and, reverse poled cells are those cells that have their anodes electrically connected to the mounting stud.

Semiconductor diodes 12 are all mounted in thermal communication with a common heat sink 16. In order to prevent the cathode *c* of semiconductor diode cells 12 from short circuiting from one cathode to the other cathodes of the semiconductor devices, insulation 22 may be used to separate the diodes 12 from the common heat sink 16. The insulation 22 should have good heat conductivity as well as good electrical insulating properties, such as mica or some of the epoxies.

The semiconductor diodes 14, mounted in thermal communication with heat sink 20, may have their cathodes *c* electrically connected to the heat sink 20, as these cathodes are all electrically connected to the positive bus 26. It may, in certain instances, be desirable to use the heat sink 20 as the positive bus, with the electrical connection 30 being made to the heat sink 20 intsead of to the bus 26 as shown in FIG. 1.

The heat sinks 16 and 20 may be cooled by liquid cooling means. If the path of the cooling means through heat sinks 16 and 20 is in a serial relationship, as shown by arrows 34, 36 and 40, insulating sections of coolant conductor will be required to connect heat sink 16 with heat sink 20.

Fuse links 42 may be used to protect the semiconductor diodes in each series leg, with the fuse links 42 being connected from the anode *a* of semiconductor diode 12 to negative bus 28, as shown, or in any other suitable location. Electrical connection 32 is made to common bus 28 to provide one of the electrical connections to the semiconductor diode assembly. In order to protect the semiconductor diode assembly from high voltage surges, surge suppression apparatus, as illustrated by fuse 44, resistor 46 and capacitor 48, may be serially connected from bus 28 to bus 26. Although not shown in FIG. 1, other protective devices, such as semiconductor diode failure indicating lights, and temperature sensitive thermostats may be mounted in thermal communication with each of the heat sinks 16 and 20. Also, conventional current balance reactors may be used to insure that the plurality of parallel connected legs will equally share the load.

It is to be understood that although all forward poled semiconductor diodes are shown in FIG. 1, that all reverse poled cells may be used, or forward and reverse poled cells may be used in various combinations. For example, if reverse poled cells were to be used in place of the diodes 12, the insulation 22 would not be required between the diodes and the coolant conductor or heat sink 16, and said heat sink could be used as an electrical bus instead of the bus 28. In other words, the electrical connection 32 could be made directly to the heat sink or coolant conductor 16.

As hereinbefore stated, it is obvious that although six parallel legs having two series diodes per leg are illustrated in FIG. 1, the exact number of parallel legs and the number of diodes connected in series in each leg depends upon the voltage and current rating of the semiconductor diode selected to be used and the voltage and current rating of the particular rectifier installation where the ignitron tubes are being replaced. In low voltage installations, the diodes per leg may be reduced to one, and on higher voltage installations, the number of diodes per leg may be increased to any desired number.

Figure 2:
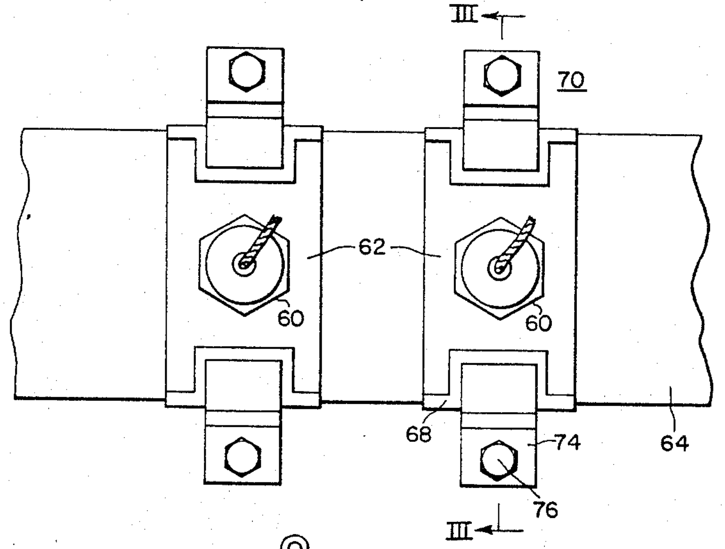
FIG. 2 shows a plan view which illustrates semiconductor diodes mounted on a heat sink assembly.
Figure 3:
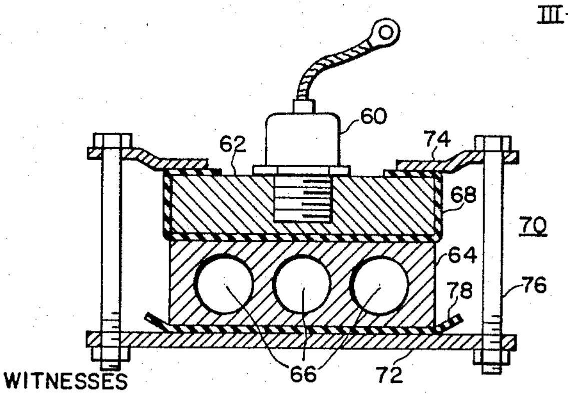
FIG. 3 shows a semiconductor diode and heat sink assembly in section taken along lines III—III of FIG. 2.

FIG. 2 shows a plan view of one method for mounting semiconductor diodes in thermal communication with the heat sink, where the diodes are required to be electrically insulated from the coolant conductor. FIG. 3 shows a section of the diodes and heat sink arrangement shown in FIG. 2, taken along the lines III—III of FIG. 2. More specifically, semiconductor diodes 60 are mounted in thermal communication with heat sink 62, which may be a metallic block of material having good heat conductivity, such as copper. The block or heat sink 62 is insulatingly mounted on liquid coolant conductor 64, which may also be a metallic material having good heat conductivity and having a plurality of paths or openings 66 through which a liquid cooling medium may flow.

In order to prevent the semiconductor diode 60 from making electrical connection with other diodes on the same coolant conductor 64, insulation 68 may be used to separate the heat sink 62 from the coolant conductor 64. This insulation should have good heat conducting properties as well as good electrical insulating properties, to allow efficient heat transfer from the heat sink 62 to the coolant conductor 64.

In order to securely hold and locate the semiconductor diode 60 and the heat sink 62 in close thermal communication with coolant conducting member 64, and also facilitate removal of the semiconductor diodes when necessary for maintenance or other purposes, fastening means or clamping arrangement 70 may be used. The clamping arrangement 70 may be comprised of a base plate 72, finger members 74 and tightening means 76. The tightening means 76 may be conventional screw type clamping, cam type clamping, or any other suitable means. The insulation means 68 may be folded around the heat sink 62 to electrically insulate the clamping fingers 74 from the heat sink 62, and insulation 78 may be used to insulate the base plate 72 from the coolant conductor 64. It can readily be seen that this arrangement allows good heat transfer from the heat sink 62 to the coolant conductor 64 and also allows fast removal of the semiconductor diodes 60 and the heat sink 62 for maintenance, or other purposes. It will be appreciated that many different means may be employed to insulatingly mount heat sink 62 in thermal communication with coolant conductor 64, and the embodiments shown are illustrative only and not meant to limit the invention to these specific arrangements.

Where it is not necessary to electrically insulate the semiconductor mounting stud on the diode casing from the other semiconductor diodes mounted in thermal communication with the same coolant conductor, it is not necessary to insulate the heat sink 62 from the coolant conductor 64. If desired, to permit the maximum efficiency and heat transfer, the heat sink 62 and coolant conductor 64 may be of one piece construction, thereby eliminating the necessity of having a clamping arrangement or means 70.

Figures 4, 5:
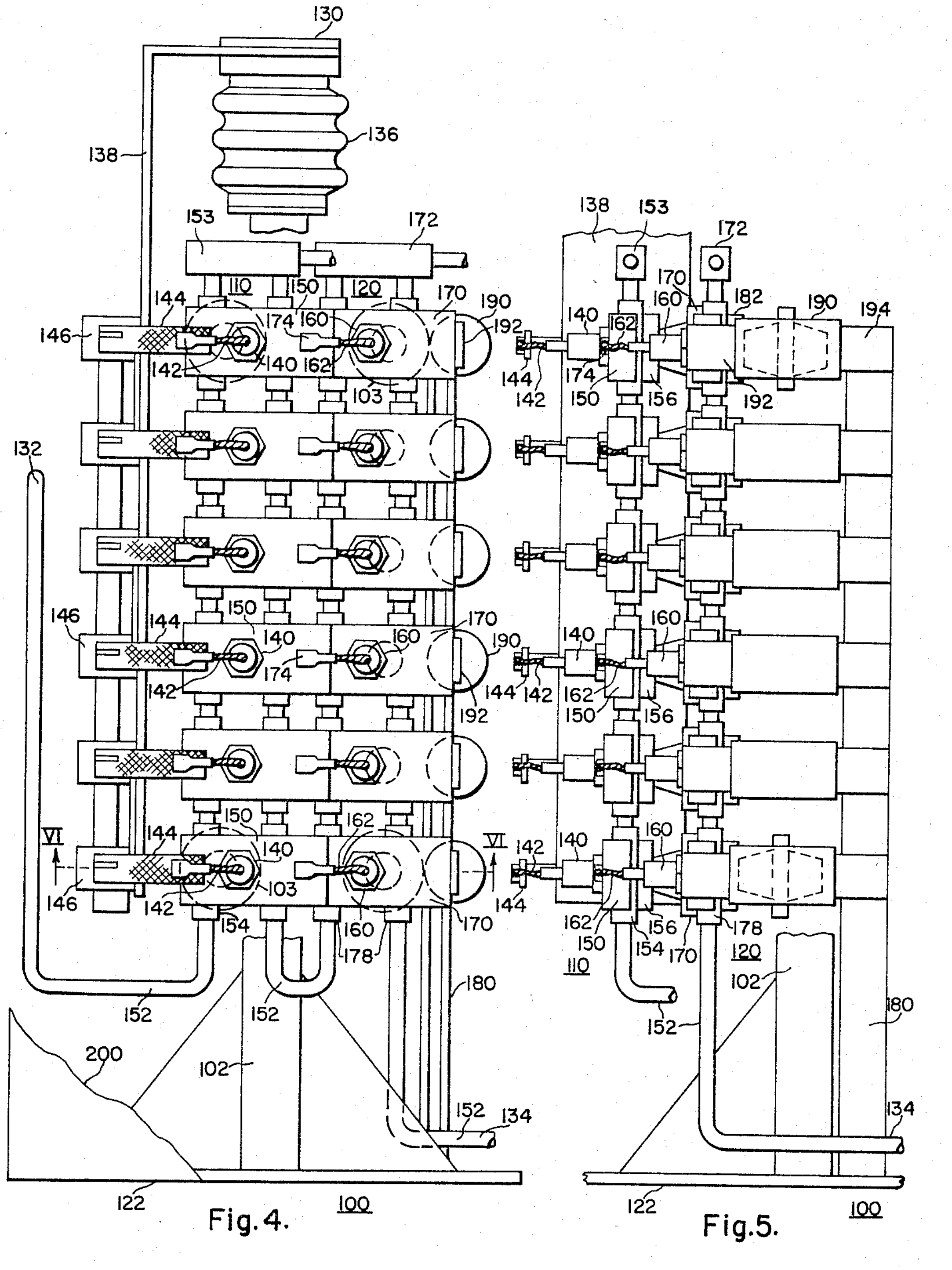
FIG. 4 shows a front elevation of a complete rectifier assembly constructed according to the teachings of this invention.
FIG. 5 shows a side elevation of a rectifier assembly illustrated in FIG. 4.

A complete rectifier assembly 100, using forward poled semiconductor diodes, is illustrated in front and side elevations in FIGS. 4 and 5, respectively. FIGURES 4 and 5 illustrate the electrical and physical arrangement of the rectifier system shown diagrammatically in FIG. 1, except fuse links 42 are physically located between the cathode electrodes *c* of diodes 14 and bus 26. Rectifier assembly 100 is designed to have the same relative locations and dimensions for electrical connections, plumbing connections, and mounting means as the ignitron tube it is to replace.

In general, rectifier assembly 100 includes anode electrical connection 130, cooling medium connections 132 and 134, and heat sink and diode assemblies 110 and 120. The various components of the assembly are all suitably secured in position by support member 102 and supporting insulators 103, with support member 102 being attached to base member 122. Base member 122 is also the cathode electrical connection to the assembly 100. The anode electrical connection 130 is insulatingly supported by member 102, through insulating member 136. Anode bus 138 connects the anode 130 with the plurality of semiconductor diodes 140 of assembly 110. Semiconductor diodes 140, in this instance being forward poled, have their anode electrodes *a* connected to flexible leads 142 and flexible lead 142 is secured, by bolting, brazing, or any fastening means, to the conducting strap 144. Conducting strap 144 is secured to bus 138, with the connection of conducting strap 144 being made to bus 138 through current balance reactor 146, if desired. The cathode connections of semiconductor diodes 140, being connected to the diode mounting stud, are thus electrically connected to mounting block and heat sink 150. In order to cool the diodes 140, coolant conductor 152 is disposed in thermal communication with the plurality of heat sinks 150. In this instance, the coolant conductor 152 enters the lower heat sink 150, traverses the plurality of heat sinks to the header 153, and returns back through the heat sinks 150 and exits through the lower of said heat sinks. In order to electrically insulate the coolant conductor 152 from heat sinks 150, insulating material 154 may be suitably disposed between the coolant conductor 152 and the plurality of heat sinks 150. Insulating material 154 should be a good heat conductor, as well as a good electrical insulator, such as mica. In order to secure the plurality of heat sinks 150 in close thermal communication with the coolant conductor 152, and still permit easy removal of the heat sink block 150 in the event of the failure of the diode 140, a clamping member 156, as shown in FIG. 5, may be used. Clamping member 156 may be secured by clamping means, as shown in FIG. 3, or any other suitable fastening means.

Diode and heat sink assembly 120 is similar in construction to the diode and heat sink assembly 110 hereinbefore described. More specifically, diode and heat sink assembly 120 includes forward pole semiconductor diodes 160, with their anode electrodes being connected to flexible lead 162 and their cathode electrodes being connected to the cell mounting stud, which is thus electrically connected to mounting block and heat sink 170. In order to cool semi-conductor diodes 160 and heat sinks 170, coolant conductor 152 is disposed in thermal communication with the plurality of heat sinks 170. In this instance, coolant conductor 152 enters the lower heat sink 170 of said plurality, traverses the plurality of heat sinks 170 to the header 172, and returns back through the heat sinks 170 and exits through the lower of said heat sinks. Thus, the cooling conductor 152 may traverse both diode and heat sink assemblies 110 and 120 in a series relation, as shown, or any other suitable cooling arrangement may be used. A cooling medium such as water, may flow through the coolant conductor 152 to remove the heat from the diodes 140 and 160, with the heated coolant being circulated to the existing heat exchanger which was used to cool the cooling medium associated with the ignitron tube being replaced. Since the heat losses by the diode assembly 100 are a small fraction of the heat losses of the ignitron tube it is replacing, the capacity of the existing heat exchanger will be more than adequate. As in diode and heat sink assembly 110, the coolant conductor 152 is shown insulated from the heat sink 170 by insulating means 178. As shown in FIGURE 1, when forward poled cells are used it is not essential that the diodes 14 be electrically insulated from coolant conductor 20. However, as hereinbefore stated, fuse links 42 have been moved, in FIGS. 4 and 5, to the position between the cathode electrodes *c* of diodes 14 and the bus 26. Therefore, the coolant conductor 152, in this instance, must be insulated from heat sink 170 by insulating means 178. Clamping member 182, as shown in FIG. 5, is used to secure coolant conductor 152 in thermal communication with the heat sinks 170.

In order to make the electrical connection from diode 160 to the diode 140, and thus connect diodes 140 and 160 in series circuit relation, the anode or flexible lead of diode 160 is secured to the heat sink 150 at connection 174. Connection 174 may be made by bolting, or any other suitable means. In order to protect the series connected diodes 140 and 160 in each leg of the rectifier assembly 100, a fuse 190 may be connected from the heat sink 170 by conductor 192, to the cathode bus 180 by conductor 194. Conductors 192 and 194 may be integral portions of the fuse 190, and suitably bolted or otherwise connected to heat sink 170 and the cathode bus 180. In order to complete the electrical circuit from the anode connection 130, through the anode bus 138, through the plurality of rectifier legs including the reactors 146, semiconductor diodes 140 and 160, and fuses 190, the cathode bus 180 is electrically connected to the base member 122. As hereinbefore stated, the base member 122 forms the cathode connection to the rectifier assembly 100, and is suitably connected by bolting or any other suitable means, to the associated apparatus.

Figure 6:
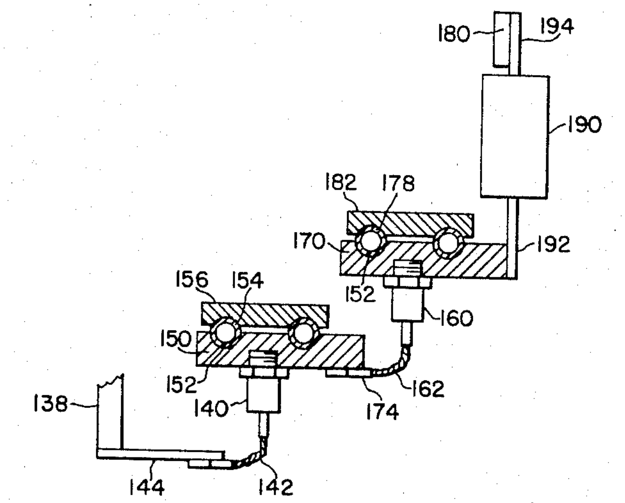
FIG. 6 shows a section taken along the lines VI–VI of FIG. 4.

FIG. 6 shows section taken along the lines VI—VI of FIG. 4, with certain components, such as current balancing reactors 146, supporting member 102 and supporting insulators 103, not shown for simplicity. FIG. 6 shows more clearly the electrical circuit from the anode bus 138 to the cathode bus 180. More specifically, the current flows from the anode bus 138, through conducting strap 144, diode 140, heat sink 150, diode 160, heat sink 170, and through fuse conductors 192 and 194 of fuse 190 to the cathode bus 180. The fuse 190 may be mounted as shown in FIGS. 4, 5, and 6 to obtain a cooling effect for fuse 190 due to its being connected to heat sink 192. This cooling of fuse 190 allows the selection of a minimum size fuse.

Figure 7:
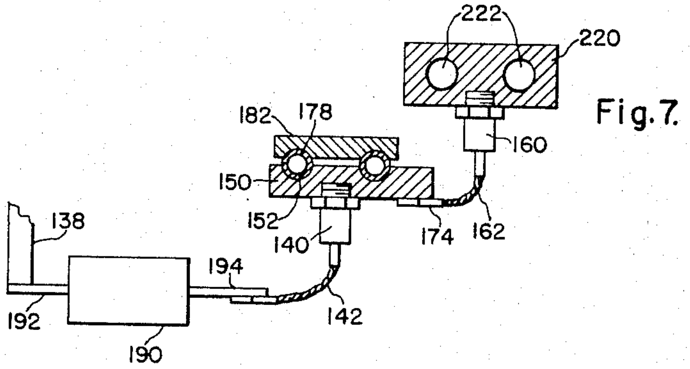
FIG. 7 illustrates another embodiment of the invention.
Figure 8:
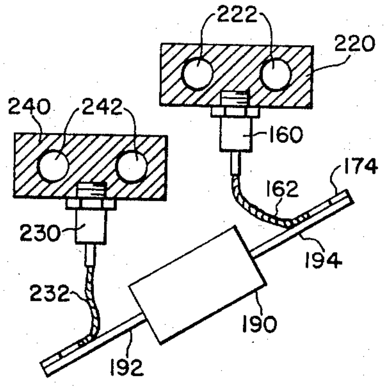
FIG. 8 illustrates still another embodiment of the invention.

FIG. 7 illustrates another embodiment of the invention, with like reference numerals in FIGS. 7 and 8 indicating like components. FIG. 7 has been arranged to show a cross section of a rectifier assembly, similar to FIG. 6, for comparison purposes with FIG. 6. When auxiliary cooling of fuse 190 is not desired or required, fuse 190 may be located in the rectifier assembly as shown in FIG. 7 and FIG. 1, between the anode bus 138 and the flexible lead 162 of diode 160. As hereinbefore stated, when forward poled diodes 140 and 160 are used, and the fuse is located as shown in FIGS. 1 and 7, the cathode electrodes of diodes 160 may be electrically connected to a heat sink 220, without the necessity of electrical insulation between the cathode electrodes and the heat sinks 220. Heat sink 220, which may have a plurality of openings 222 for the passage of a cooling medium, is simpler in design and may be connected directly to the base member 122, which is the cathode connection to the rectifier assembly 100, thus eliminating the requirement of a separate cathode bus 180. Heat sink 220 may be a metallic conductor, such as copper, and may be of one piece construction, eliminating the requirement of disposing members 150 and 182 in thermal communication with electrically insulated coolant conductor 152.

Another embodiment of the invention is shown in FIG. 8, with like reference numerals in FIGS. 7 and 8, indicating like components. FIG. 8 illustrates how the embodiments shown in FIGS. 6 and 7 may be further simplified by utilizing forward and reverse poled diodes. More specifically, by changing the forward poled diode 140 of FIG. 7 to a reverse poled diode 230 having a flexible lead 232, a heat sink 240, similar to heat sink 220, may be utilized, and fuse 190 may be disposed between the flexible leads 232 and 162 of diodes 230 and 160, respectively. Using reverse poled diodes 230 allows the anode electrodes of diodes 230 to be electrically connected together, and, therefore, all of said anode electrodes may be mounted on a common heat sink 240. Heat sink 240 may be of one piece construction, with openings 242 for cooling medium, and may serve as the anode bus, thus eliminating anode bus 138.

Reverse poled diode 230 has its anode, or mounting stud, connected to heat sink 240, and its cathode, or flexible lead, connected to conductor 192 and fuse 190. The electrical circuit is completed from fuse 190 to heat sink 220 through forward poled diode 160, with conductor 194 being connected to the flexible lead 162 of diode 160 and the mounting stud of diode 160 being connected to heat sink 220. The advantages of the arrangement shown in FIG. 8, where reverse and forward poled diodes 230 and 160, respectively, are utilized, are the elimination of separate anode and cathode buses 138 and 180, respectively, and the more simple construction of heat sinks 220 and 240.

In summary, the semiconductor diode assembly shown in FIGS. 4 and 5 is physically and electrically interchangeable with an ignitron tube of similar rating. To replace an existing ignitron tube with rectifier assembly

100 requires only that the ignitron tube be disconnected from the coolant conductors, unbolted from its mounting position, which disconnects the cathode connection at the same time, disconnecting the anode connection and disconnecting the excitation circuit. The rectifier assembly 100 is then mounted in the same location as the removed ignitron tube and bolted into place on its mounting pad 122, which connects the cathode bus 180 into the associated electrical circuit. The anode connection 130 is made to the associated electrical circuit and, the coolant conductor 152 is connected into the existing cooling system at points 132 and 134, which correspond with the connections on the replaced ignitron tube. The excitation circuit need not be reconnected, as semiconductor diodes, unlike ignitron tubes, are free conducting, requiring only that the anode be positive with respect to the cathode to allow current conduction. Also, since the voltage drop across semiconductor diodes is very small compared to the voltage drop across the ignitron, the unidirectional output voltage of the semiconductor diode assembly 100 will be higher than the unidirectional output voltage of the ignitron tube it has replaced. Where required, compensation for this higher output voltage can easily be accomplished by changing transformer taps on the rectifier transformer of the existing equipment.

As shown in fragment in FIG. 4, an enclosure 200 may be used to substantially surround the rectifier assembly 100, if desired. The enclosure 200 may be hinged for easy removal for maintenance, or other purposes. If the enclosure is a conductor of electricity and is mounted on the base 122, the anode electrode 130 would have to be insulated from said enclosure. The enclosure 200 may be a non-conductor of electricity, such as plexiglass, and transparent to allow visual inspection. In most instances, however, an enclosure would not be necessary and, would prevent the cooling effect obtained by air freely moving over the outside surfaces of the semiconductor diodes and heat sink assemblies.

It can, therefore, be seen that replacing an ignitron tube of a given size and rating with a semiconductor diode assembly having the same rating is as easy to accomplish when using the principles outlined in this invention as changing from one ignitron tube to another ignitron tube. Therefore, an ignitron rectifier apparatus may be easily converted to a semiconductor diode apparatus, and the modified installation will use the existing transformers, switchgear and cooling systems without any changes required in these particular items. Any vacuum pumping apparatus associated with the ignitron installation, will not be required upon changing over to semiconductor diode type rectifiers.

It will, therefore, be apparent that there has been disclosed a new and improved rectifier assembly using semiconductor diodes that will replace ignitron tubes in existing installation without modifications of the existing apparatus.

Since numerous changes may be made in the above described apparatus and different embodiments of the invention may be made without departing from the spirit therof, it is intended that all matter contained in the foregoing description or shown in the accompanying drawings shall be interpreted as illustrative, and not in a limiting sense.

We claim as our invention:

1. A rectifier assembly physically and electrically interchangeable with ignitron rectifier tubes comprising a base member, a first heat sink member having a plurality of semiconductor diodes mounted in thermal communication with said first heat sink member, said first heat sink member being mounted on and electrically connected to said base member, a second heat sink member disposed on said base member but electrically insulated therefrom having a plurality of semiconductor diodes mounted in thermal communication with said second heat sink member, the semiconductor diodes disposed on said second heat sink being electrically insulated from one another, coolant connections suitably disposed on said rectifier assembly for supplying coolant to said heat sink members, and an electrical terminal, the semiconductor diodes of said second heat sink member being connected in circuit relationship with said electrical terminal.

2. A rectifier assembly physically and electrically interchangeable with ignitron rectifier tubes comprising a base member, a first heat sink member having semiconductor rectifier means disposed in thermal communication with said first heat sink member, said first heat sink member being disposed on and electrically connected to said base member, a second heat sink member disposed on said base member but electrically insulated therefrom, said second heat sink member having semiconductor rectifier means mounted in thermal communication with said second heat sink member, the semiconductor rectifier means disposed on said second heat sink member being connected in circuit relation with the semiconductor rectifier means disposed on said first heat sink member, the semiconductor rectifier means disposed on said second heat sink member being electrically insulated from one another, cooling conductor means suitably disposed on said rectifier assembly for supplying coolant to said heat sink members, an electrical terminal, the semiconductor rectifier means of said second heat sink member being connected in circuit relation with said electrical terminal.

3. A rectifier assembly physically and electrically interchangeable with an ignitron rectifier tube comprising a base member, said base member being a first electrical connection to said rectifier assembly, first and second heat sink assemblies, each of said heat sink assemblies comprising a plurality of heat sink members disposed in thermal communication with cooling means, semiconductor diodes disposed in thermal communication with said heat sink members, said semiconductor diodes each having an anode and a cathode, said first and second heat sink assemblies being mounted on said base member, the semiconductor diodes mounted on said first heat sink assembly being connected in circuit relation with the semiconductor diodes mounted on said second heat sink assembly, the anodes of the semiconductor diodes mounted on the first heat sink assembly being connected together to form a second electrical connection to said rectifier assembly, the cathodes of the semiconductor diodes mounted on said second heat sink assembly being connected to said base member, and means comprising inlet and outlet cooling connections connected with said first and second heat sink assemblies.

4. A rectifier assembly physically and electrically interchangeable with a mercury-arc rectifier tube comprising a base member, said base member being a first electrical connection to said rectifier assembly, a plurality of liquid cooled heat sink assemblies, semiconductor diodes having anode and cathode electrodes disposed in thermal communication with said heat sink assemblies, each semiconductor diode disposed on one heat sink assembly being connected in series circuit relation with a predetermined semiconductor diode disposed on each of the remaining heat sink assemblies, said plurality of heat sink assemblies being disposed on said base member, the anodes of the semiconductor diodes in one of said heat sink assemblies being connected together to form a second electrical connection to said rectifier assembly, the cathodes of the semiconductor diodes mounted on another of said heat sink being connected to said base member, and coolant conducting means disposed on said rectifier assembly and connected to said plurality of liquid cooled heat sink assemblies.

5. A rectifier assembly physically and electrically interchangeable with an ignitron tube comprising a base member having mounting means, said mounting means forming a first electrical connection to said rectifier assembly, a plurality of heat sink assemblies, said plurality of heat sink assemblies each comprising a coolant conductor having spaced block members insulatingly attached thereto by fastening means, semiconductor diodes each having an anode and cathode electrode disposed on said block members, said heat sink assemblies being mounted on and electrically insulated from said base member, each semiconductor diode on one heat sink assembly being connected in series circuit relation with a semiconductor diode on each of the other heat sink assemblies, leaving one heat sink assembly having semiconductor diodes with unconnected cathodes and one heat sink assembly having semiconductor diodes with unconnected anodes, the unconnected anodes being connected together to form a second electrical connection to said rectifier assembly, the unconnected cathodes being connected to said mounting means, and coolant conducting means connecting said plurality of heat sink assemblies and having inlet and outlet connections.

6. A rectifier assembly physically and electrically interchangeable with an ignitron tube comprising a base member having mounting means, said mounting means forming a first electrical connection to said rectifier assembly, first and second heat sink members having coolant paths therein, a plurality of forward poled semiconductor diodes disposed in thermal communication with said first heat sink member, said first heat sink member being disposed on and electrically connected to said base member, a plurality of reverse poled semiconductor diodes disposed in thermal communication with said second heat sink member, said second heat sink member being disposed on and electrically insulated from said base member, each forward poled semiconductor diode being connected in series circuit relation with a reverse poled semiconductor diode, said second heat sink member forming a second electrical connection to said rectifier assembly, and coolant connections to said rectifier assembly for connection to an external coolant source for cooling said first and second heat sink members.

7. A rectifier assembly physically and electrically interchangeable with an ignitron tube comprising a base member having mounting means, said mounting means forming a first electrical connection to said rectifier assembly, a plurality of heat sink assemblies, each of said heat sink assemblies comprising a coolant conductor having spaced blocked members insulatingly attached thereto by fastening means, semiconductor diodes each having an anode and cathode disposed in thermal communication with said block members, said heat sink assemblies being disposed on and electrically insulated from said base member, means protecting said semiconductor diodes from excessive voltage and current, each semiconductor diode on one heat sink assembly being connected in series circuit relation with a semiconductor diode on each of the other heat sink assemblies leaving one heat sink assembly having semiconductor diodes with unconnected anodes and one heat sink assembly having semiconductor diodes with unconnected cathodes, the unconnected cathodes being connected to said mounting means, the unconnected anodes being connected together to form a second electrical connection to said rectifier assembly, coolant conducting means connecting said heat sink assemblies and having inlet and outlet connections, and means comprising reactors arranged to cause said semiconductor diodes to share the load equally.

8. A rectifier assembly physically and electrically interchangeable with an ignitron tube comprising a base member, said base member forming a first electrical connection to said rectifier assembly, a plurality of heat sink assemblies, said plurality of heat sink assemblies each comprising a coolant conductor having spaced block members insulatingly attached thereto, semiconductor diodes each having an anode and cathode electrode disposed on said block members, said heat sink assemblies being disposed on said base member but electrically insulated therefrom, each semiconductor diode on one heat sink assembly being connected in series circuit relation with a semiconductor diode on each of the other heat sink assemblies leaving one heat sink assembly having semiconductor diodes with unconnected anodes and one heat sink assembly having forward poled semiconductor diodes with unconnected cathodes, the unconnected anodes being connected together to form a second electrical connection to said rectifier assembly, a plurality of fuse elements, one side of each of said fuse elements being connected to the block members on the heat sink assembly having the semi-conductor diodes with the unconnected cathodes, the remaining side of said fuse elements being connected to said base member, and coolant conducting means connecting said plurality of heat sink assemblies.

9. A semiconductor rectifier assembly physically and electrically interchangeabe with a mercury-arc rectifier tube of the type which has a mounting base which also forms an electrical connection, and coolant connections for connection to an external source of coolant, said semiconductor rectifier assembly comprising a mounting base member adapted to physically and electrically cooperate with means for receiving a mercury-arc rectifier tube, said mounting base member forming a first electrical terminal for said semiconductor rectifier assembly, a second electrical terminal disposed in an insulating manner on the mounting base member of said semiconductor rectifier assembly, said second terminal being adapted to cooperate with means for receiving a mercury-arc rectifier tube, heat sink means disposed on the mounting base member of said semiconductor rectifier assembly, a plurality of semiconductor rectifiers disposed in thermal communication with said heat sink means, coolant conductor connections disposed in communication with said heat sink means, said coolant conductor connections being adapted to cooperate with means for receiving a mercury-arc rectifier tube, said semiconductor rectifiers being electrically connected to provide a plurality of series circuits, each having first and second ends, the first ends of the plurality of series circuits being electrically connected to said mounting base member, the second ends of the plurality of series circuits being electrically connected to said second electrical terminal.

References Cited by the Examiner

UNITED STATES PATENTS

| | | | |
|---|---|---|---|
| 2,945,961 | 7/1960 | Healis | 321—27 |
| 3,018,424 | 1/1962 | Colaiaco | 317—234 X |

JOHN F. COUCH, *Primary Examiner.*

LLOYD McCOLLUM, *Examiner.*

W. H. BEHA, *Assistant Examiner.*